US008786593B2

(12) United States Patent
Joung et al.

(10) Patent No.: US 8,786,593 B2
(45) Date of Patent: Jul. 22, 2014

(54) METHOD FOR RECORDING THREE-DIMENSIONAL VIDEO DATA AND MEDIUM RECORDING THE SAME

(75) Inventors: Do-Young Joung, Seoul (KR); Tae-Sung Park, Yongin-si (KR); Yun-Je Oh, Yongin-si (KR); Doug-Young Suh, Yongin-si (KR); Gwang-Hoon Park, Yongin-si (KR); Kyu-Heon Kim, Yongin-si (KR); Yoon-Jin Lee, Yongin-si (KR)

(73) Assignees: Samsung Electronics Co., Ltd., Samsung-ro, Yeongtong-gu, Suwon-si, Gyeonggi-do (KR); University-Industry Cooperation Group of Kyung Hee University, Seocheon-dong, Giheung-gu, Yongin-si, Gyeonggi-do (KR)

( * ) Notice: Subject to any disclaimer, the term of this patent is extended or adjusted under 35 U.S.C. 154(b) by 751 days.

(21) Appl. No.: 12/135,274

(22) Filed: Jun. 9, 2008

(65) Prior Publication Data

US 2008/0303813 A1 Dec. 11, 2008

(30) Foreign Application Priority Data

Jun. 8, 2007 (KR) .................. 10-2007-0056343
Jun. 18, 2007 (KR) .................. 10-2007-0059662

(51) Int. Cl.
*G06T 15/00* (2011.01)
(52) U.S. Cl.
USPC ........................................................ 345/419
(58) Field of Classification Search
None
See application file for complete search history.

(56) References Cited

U.S. PATENT DOCUMENTS 6,532,008 B1 * 3/2003 Guralnick ..................... 345/419
6,593,936 B1 * 7/2003 Huang et al. .................. 345/619

(Continued)

FOREIGN PATENT DOCUMENTS

CN 1109667 A 10/1995 ............ H04N 15/00
CN 1613263 A 5/2005

OTHER PUBLICATIONS

ISO/IEC JTC1/SC29/WG11 N4668: "Overview of the MPEG-4 Standard" by Rob Koenen, Mar. 2002.*

(Continued)

*Primary Examiner* — Aaron M Richer
*Assistant Examiner* — Anh-Tuan V Nguyen
(74) *Attorney, Agent, or Firm* — Cha & Reiter, LLC

(57) ABSTRACT

Disclosed is a method of storing scene comprising a three-dimensional image, which has been generated by converting an image input an apparatus supporting photographing of the three-dimensional image, into a recording medium. The method includes: loading, in a predetermined file type field, image type information indicating one of a single stereoscopic image and a synthetic image including a monoscopic image and a stereoscopic image; loading, in a configurative information container field, scene descriptor information indicating temporal and spatial relations between a plurality of media objects included in the three-dimensional image, object configurative information indicating object attributes of each media object of said plurality of media objects and a configurative relation between encoded streams of each of the media objects of said plurality, configurative information of the encoded streams, first metadata between the plurality of media objects, and second metadata between each media object of the plurality and the encoded stream thereof, and loading, in a media data container field, a bit stream of each media object included in the three-dimensional image, a bit stream for the first metadata, and a bit stream for the second metadata.

19 Claims, 12 Drawing Sheets

(56) References Cited

U.S. PATENT DOCUMENTS

| | | | |
|---|---|---|---|
| 6,611,262 B1* | 8/2003 | Suzuki | 345/419 |
| 7,062,758 B2* | 6/2006 | Yokoyama | 717/136 |
| 7,266,563 B2* | 9/2007 | Morris et al. | 707/702 |
| 7,506,024 B2* | 3/2009 | Benitez et al. | 709/203 |
| 7,668,866 B2* | 2/2010 | Liu et al. | 713/176 |
| 2003/0084180 A1* | 5/2003 | Azami | 709/231 |
| 2003/0095177 A1* | 5/2003 | Yun et al. | 348/42 |
| 2003/0188182 A1* | 10/2003 | Sato et al. | 713/193 |
| 2004/0117822 A1* | 6/2004 | Karaoguz et al. | 725/37 |
| 2005/0086582 A1* | 4/2005 | Frojdh et al. | 715/501.1 |
| 2005/0128584 A1* | 6/2005 | Shulman et al. | 359/462 |
| 2005/0278375 A1* | 12/2005 | Mitchko et al. | 707/104.1 |

OTHER PUBLICATIONS

Dogruel, A Method for Concealment of Displayed Data, 2003, Displays, vol. 24, pp. 97-102.*

ISO/IEC 14496-12 International Standard; "Information Technology—Coding of Audio-Visual Objects; Part 12: ISO Base Media File Format;" Oct. 1, 2005; XP007914375.

Smolic, Aljoscha; "3D Video and Free Viewpoint Video—From Capture to Display;" Elsevier; Pattern Recognition; Sep. 2010; XP007915298.

Kim, Man Bae, et al.; "The Adaption of 3D Stereoscopic Video in MPEG-21 DIA;" Image Communication, Elsevier Science Publishers, Amsterdam, NL; vol. 18, No. 8; Sep. 1, 2003; XP004452905.

Ransburg, Michael, et al.; "Support for Timed Metadata in the MPEG-21 File Format;" Klagenfurt University, Austria; No. M12023; Apr. 29, 2005; XP030040731.

Hunter, Jane, et al.; "A Comparison of Schemas for Video Metadata Representation;" Computer Networks & ISDN Systems, Amsterdam, NL; vol. 31, No. 11-16; May 17, 1999; XP000861557.

Benitez, Ana Belen, et al; Patent Application Publication No: US 2006/0167876 A1; Publication Date: Jul. 27, 2006; "Multimedia Integration Description Scheme, Method . . .;".

Kosch, H.; "Distributed Multimedia Database Technologies Supported by MPEG-7 and MPEG-21;" Nov. 24, 2003; XP002497634; Retrieved from the Internet: http://www-itec.uni-klu.ac.at/{harald/mmbook/sample.pdf> (Retrieved on Sep. 26, 2008).

* cited by examiner ssod (StereoScopic ObjectDescriptor Type)

Box Type : 'ssod'
Container : Track Reference Box ('tref')
Mandatory : No
Quantity : Zero or one Syntax

```
aligned (8) class StereoScopicObjectDescriptorTypeBox extend Box ('ssod', 0, 0) {
int I, j;
unsigned int (32)    stereoscopic_od_entry_count;
for( i=0; i<stereoscopic_od_entry_count; i++ )
{
    unsigned int (1)     stereoscopic_od_type;
    unsigned int (1)     metadata-flag;
    unsigned int (6)     reserved;

unsigned int (32)    stereoscopic_es_entry_count;
    if ( metadata-flag == 1 ) {
        unsigned int (32)    metadata-track-ID;
    } for ( j=0; j<stereoscopic_es_entry_count; j++ )
    {
        unsigned int (32)    track-ID[j];
    }
 }
}
```

FIG.4 ssom (StereoScopic Overall Metadata Type)

Box Type : 'ssom'
Container : Track Reference Box ('tref')
Mandatory : No
Quantity : Zero or one Syntax aligned (8) class StereoScopicOverallMetadataTypeBox extend Box ('ssom', 0, 0) {
unsigned int (32)     track-ID;
}

FIG.5 mpss (StereoScopic Visual Sample Entry)

Box Type : 'mpss', 'mp4v', 'mp4a', 'mp4s'
Container : Sample Table Box ('stbl')
Mandatory : Yes
Quantity : Exactly one Syntax

```
aligned (8) class ESDBox extends Box ('esds', version = 0, 0) {
    ES_Descriptor   ES;   // refer to 14496-1
}
aligned (8) abstract class SampleEntry (unsigned int (32) format) extends Box (format) {
    // refer to 14496-12 ISO base media file format
}
 class HintSampleEntry () extends SampleEntry (protocol) {
    // refer to 14496-12 ISO base media file format
}
 class AudioSampleEntry (codingname) extends SampleEntry (codingname) {
    // refer to 14496-12 ISO base media file format
}
 class VisualSampleEntry (codingname) extends SampleEntry (codingname) {
    // refer to 14496-12 ISO base media file format
}
 class MpegSampleEntry () extends SampleEntry ('mp4s') {
    ESDBox    ES;    // refer to 14496-1
}
```

FIG.7A

```
class MpegVisualSampleEntry () extends VisualSampleEntry ('mp4v') {
    ESDBox    ES;    // refer to 14496-1
}
```

```
class Mpeg Audio Smaple Entry () extends Sample Entry ('mp4a'){
    if ( iod_track ) {
        ESDBox ES;
    } else {
        unsigned int (8)    StreamType;
        unsigned int (8)    ObjectTypeIndication;
        unsigned int (8)    DecoderSpecificInfoLength;
        for ( int i=0; i<DecoderSpecInfoLength; i++ )
            unsigned int (8)    DecoderSpecificInfoStream[i];
    }
}
class StereoScopicVisualSampleEntry(unsigned int(4) StereoScopic_ES_count) extends
VisualSampleEntry ('mpss') {
```

300

```
    if ( StereoScopic_ES_count == 1 ) {
        unsigned int (3)    StereoScopic_CompositionType;
        unsigned int (1)    reserved;
        unsigned int (2)    StereoScopic_ES_FrameSync;
        unsigned int (2)    StereoScopic_ImageInformationDifference;
        if ( StereoScopic_ CompositionType != 0 ) {
            int (16)    width_or_height;
            int (16)    odd_field_count;
            int (16)    even_field_count;
```

FIG.7B

```
if ( StereoScopic_ImageInformationDifference != 0 ) {
        int (16)    Y_or_R_difference;
        int (16)    Cb_or_G_difference;
        int (16)    Cr_or_B_difference;
    }
} else if ( StereoScopic_ES_count == 2 ) {
    unsigned int (2)    StereoScopic_ES_Type;
    unsigned int (2)    reserved;
    unsigned int (2)    StereoScopic_ES_FrameSync;
    unsigned int (2)    StereoScopic_ImageInformationDifference;

if ( StereoScopic_ImageInformationDifference == '0b10' ) {
        int (16)    Y_or_R_difference;
        int (16)    Cb_or_G_difference;
        int (16)    Cr_or_B_difference;
    }
} else {
    unsigned int (2)    StereoScopic_ES_Type;
    unsigned int (6)    reserved;
}
```

FIG.7C

```
                                                              350
                                                              )
    if ( iod_track ) {
        ESDBox ES;
    } else {
        unsigned int (8)    StreamType;
        unsigned int (8)    ObjectTypeIndication;
        unsigned int (8)    DecoderSpecificInfoLength;
        for ( int i=0; i<DecoderSpecInfoLength; i++ )
            unsigned int (8)    DecoderSpecificInfoStream[i];
    }
} class SampleDescriptionBox (unsigned int (32) handle-type) extend Box ('stsd', 0, 0) {
    int i;
    unsigned int (32)    entry-count;
    for ( i=0; i<entry-count; i++) {
        switch (handler-type) {
        case 'soun' : // Audio Stream
                    MpegAudioSampleEntry();
                    break;
        case 'vide' : // Visual Stream
                    MpegVisualSampleEntry();
                    break;
        case 'ssvi' : // StereoScopic Visual Stream
                    StereroScopicVisualSampleEntry();
                    break;
        case 'hint' : // Hint track
                    HintSampleEntry();
                    break;
        default :
                    MpegSampleEntry();
                    break;
        }
    }
}
```

FIG.7D

METHOD FOR RECORDING THREE-DIMENSIONAL VIDEO DATA AND MEDIUM RECORDING THE SAME

CLAIM OF PRIORITY

This application claims the priority under 35 U.S.C. §119 (a) of applications entitled "Method For Recording Three-Dimensional Video Data And Medium Recording The Same," filed in the Korean Intellectual Property Office on Jun. 8 and Jun. 18, 2007 and respectively assigned Serial Nos. 2007-56343 and 2007-59662, the contents of which are hereby incorporated by reference.

BACKGROUND OF THE INVENTION

1. Field of the Invention

The present invention relates to a recording medium and a method for recording three-dimensional video data, and more particularly to a method for generating and storing three-dimensional video data in a format having a structure compatible with the MPEG 14496-12 ISO base media file format.

2. Description of the Related Art

A typical media file format basically includes a header part for recording information of the media and a video data part for storing compressed media data. However, while the typical media file format is appropriate for storage of simple video data, it is not appropriate as a general structure for storing various types of media.

In this regard, the Moving Picture Experts Group (MPEG), which is an international standard organization, in standard ISO/IEC 14496 defines the MPEG-4 ISO base media file format as a basic file format commonly applicable to various applications. The ISO base media file format has been designed to hierarchically store a compressed media stream and data (e.g., such as configurative information) related to the media stream in multiple containers. The ISO base media file format does not basically define an encoding or decoding scheme, but defines a basic structure for effectively storing an encoded or decoded media stream.

MPEG-4 consists of several standards—termed "parts"—including the following:

| Part | Number | Title | Description |
|---|---|---|---|
| Part 1 | ISO/IEC 14496-1 | Systems | Describes synchronization and multiplexing of video and audio. For example Transport stream. |
| Part 2 | ISO/IEC 14496-2 | Visual | A compression codec for visual data (video, still textures, synthetic images, etc.). One of the many "profiles" in Part 2 is the Advanced Simple Profile (ASP). |
| Part 3 | ISO/IEC 14496-3 | Audio | A set of compression codecs for perceptual coding of audio signals, including some variations of Advanced Audio Coding (AAC) as well as other audio/speech coding tools. |
| Part 4 | ISO/IEC 14496-4 | Conformance | Describes procedures for testing conformance to other parts of the standard. |
| Part 5 | ISO/IEC 14496-5 | Reference Software | Provides software for demonstrating and clarifying the other parts of the standard. |
| Part 6 | ISO/IEC 14496-6 | Delivery Multimedia Integration Framework (DMIF). | |
| Part 7 | ISO/IEC 14496-7 | Optimized Reference Software | Provides examples of how to make improved implementations (e.g., in relation to Part 5). |
| Part 8 | ISO/IEC 14496-8 | Carriage on IP networks | Specifies a method to carry MPEG-4 content on IP networks. |
| Part 9 | ISO/IEC 14496-9 | Reference Hardware | Provides hardware designs for demonstrating how to implement the other parts of the standard. |
| Part 10 | ISO/IEC 14496-10 | Advanced Video Coding (AVC) | A codec for video signals which is technically identical to the ITU-T H.264 standard. |
| Part 11 | ISO/IEC 14496-11 | Scene description and Application engine("BIFS") | Can be used for rich, interactive content with multiple profiles, including 2D and 3D versions. |
| Part 12 | ISO/IEC 14496-12 | ISO Base Media File Format | A file format for storing media content. |
| Part 13 | ISO/IEC 14496-13 | Intellectual Property Management and Protection (IPMP) Extensions. | |
| Part 14 | ISO/IEC 14496-14 | MPEG-4 File Format | The designated container file format for MPEG-4 content, which is based on Part 12. |
| Part 15 | ISO/IEC 14496-15 | AVC File Format | For storage of Part 10 video based on Part 12. |
| Part 16 | ISO/IEC 14496-16 | Animation Framework eXtension (AFX). | |
| Part 17 | ISO/IEC 14496-17 | Timed Text subtitle format. | |
| Part 18 | ISO/IEC 14496-18 | Font Compression and Streaming (for OpenType fonts). | |
| Part 19 | ISO/IEC 14496-19 | Synthesized Texture Stream. | |
| Part 20 | ISO/IEC 14496-20 | Lightweight Application Scene Representation (LASeR). | |
| Part 21 | ISO/IEC 14496-21 | MPEG-J Graphical Framework eXtension (GFX) | (not yet finished - at "FCD" stage in July 2005, FDIS January 2006). |
| Part 22 | ISO/IEC 14496-22 | Open Font Format Specification (OFFS) based on OpenType | (not yet finished - reached "CD" stage in July 2005) |
| Part 23 | ISO/IEC 14496-23 | Symbolic Music Representation (SMR) | (not yet finished - reached "FCD" stage in October 2006) |

Profiles are also defined within the individual "parts", so an implementation of a part is ordinarily not an implementation of an entire part.

However, such a media file format, which has a structure defined in order to store two-dimensional video, is not appropriate for storage of three-dimensional video including a stereoscopic image and various media data. Therefore, there is a need for a data storage format defined in consideration of a structure of a stereoscopic image. Simultaneously, such a stereoscopic image is required to have a data storage format compatible with the ISO base media file format, which is an international standard, so that it can be applied to various multimedia applications. In particular, the data storage format must be compatible with 14496-12 ISO base media file format which is referred to in FIG. 7A.

SUMMARY OF THE INVENTION

Accordingly, the present invention has been made to solve the above-mentioned problems occurring in the prior art and provides additional advantages. In particular, the present invention provides a data storage format, which includes information on a configuration of a stereoscopic image and is compatible with the ISO base media file format, an international standard, and a method of generating the data storage format.

In accordance with an aspect of the present invention, there is provided a method of storing a three-dimensional image, which has been generated by converting an image input by an apparatus supporting photographing of the three-dimensional image, in a recording medium, the method including the steps of: loading, in a predetermined file type field, image type information indicating one of a single stereoscopic image and a synthetic image including a monoscopic image and a stereoscopic image; loading, in a configurative information container field, scene descriptor information indicating temporal and spatial relations between a plurality of media objects included in the three-dimensional image, object configurative information indicating object attributes of each media object of said plurality of media objects and a configurative relation between a plurality of encoded streams of the plurality of media objects, configurative information of each stream of the plurality of encoded streams, first metadata between the plurality of media objects, and second metadata between each media object of said plurality and one encoded stream of said plurality of encoded streams; and loading, in a media data container field, a bit stream of each media object of the plurality of media objects included in the three-dimensional image, a bit stream for the first metadata, and a bit stream for the second metadata.

The object configurative information includes: information indicating the number of objects of the plurality of media objects included in a scene; information indicating if each object of said plurality of objects is a stereoscopic image; information indicating if each object of said plurality of objects requires metadata; information indicating the number of the plurality of encoded streams included in each object; when a metadata is applied to an object of said plurality of objects, information indicating a track including the metadata to be applied; and information indicating a track including an encoded stream of said plurality of encoded streams.

The object configurative information may further include information indicating a track including metadata applicable to an overall stereoscopic image.

In accordance with another aspect of the present invention, there is provided a medium readable by a computer in which a three-dimensional image is loaded, the medium including: a file type field containing image type information indicating one of a single stereoscopic image and a synthetic image including a monoscopic image and a stereoscopic image; a configurative information container field containing scene descriptor information indicating temporal and spatial relations between a plurality of media objects included in the three-dimensional image, object configurative information indicating object attributes of each media object of said plurality of media objects and a configurative relation between a plurality of encoded streams of the plurality of media objects, configurative information of the plurality of encoded streams, first metadata between the plurality of media objects, and second metadata between each media object of the plurality of media objects and a corresponding encoded stream of the plurality of encoded streams; and a media data container field containing a bit stream of each media object included in the three-dimensional image, a bit stream for the first metadata, and a bit stream for the second metadata.

In accordance with another aspect of the present invention, there is provided a method of storing a three-dimensional image, which has been generated by converting an image input by an apparatus supporting photographing of the three-dimensional image, in a recording medium, the method including: loading, in a predetermined file type field, image type information indicating one of a single stereoscopic image and a synthetic image including a monoscopic image and a stereoscopic image; loading, in a configurative information container field, object configurative information indicating object attributes of each media object of a plurality of media objects and a configurative relation between encoded streams of a plurality of encoded streams comprising an encoded stream corresponding to each media object of the plurality of media objects included in the three-dimensional image, configurative information of each of encoded streams of the plurality of encoded streams, first metadata between the media objects of said plurality, and second metadata between each media object and the corresponding encoded stream thereof; and loading, in a media data container field, a bit stream of each media object included in the three-dimensional image, a bit stream for the first metadata, and a bit stream for the second metadata, wherein scene descriptor information indicating temporal and spatial relations between the media objects of said plurality of media objects included in the three-dimensional image is selectively loaded in the configurative information container field, and the configurative information of the plurality of encoded streams includes information regarding if the scene descriptor information is loaded.

The scene descriptor information of a scene includes: an initial scene descriptor information field containing information on an initial access pointer and a scene description; a scene information field containing information on a configurative relation of a plurality of media objects included in the scene; and an object configurative information field containing information on attributes of each media object of said plurality of media objects.

When the configurative information container field includes the initial scene descriptor information, configurative information of the encoded stream contains decoder information on the plurality of media objects included in the initial scene descriptor information.

When the configurative information container field does not include the initial scene descriptor information, configurative information of the encoded stream contains decoder information on the plurality of media objects included in the stereoscopic image.

The media types may be information set based on Object Type Indication (OTI) defined in the MPEG-4 system.

The first metadata includes information on a length of a bit stream of an encoded stream and an identifier of the encoded stream, and the second metadata includes information on a name and a content type of each encoded stream, and encoding information.

In accordance with another aspect of the present invention, there is provided a medium readable by a computer in which a three-dimensional image is loaded, the medium including: a predetermined file type field containing image type information indicating one of a single stereoscopic image and a synthetic image including a monoscopic image and a stereoscopic image; a configurative information container field containing object configurative information indicating object attributes of each media object of a plurality of media objects and a configurative relation between a plurality of encoded streams of the media objects included in the three-dimensional image, configurative information of the encoded streams, first metadata between the media objects, and second metadata between each media object and the encoded stream; and a media data container field containing a bit stream of each media object included in the three-dimensional image, a bit stream for the first metadata, and a bit stream for the second metadata, wherein scene descriptor information indicating temporal and spatial relations between the media objects of the plurality of media objects included in the three-dimensional image is selectively loaded in the configurative information container field, and the configurative information of the encoded streams includes information regarding if the scene descriptor information is loaded.

BRIEF DESCRIPTION OF THE DRAWINGS

The above and other aspects, features and advantages of the present invention will be more apparent from the following detailed description taken in conjunction with the accompanying drawings, in which:

FIG. 4 illustrates an example of a program for generating an ssod field included in a storage format according to an embodiment of the present invention;

FIG. 5 illustrates an example of a program for generating an ssod field included in a storage format according to an embodiment of the present invention;

FIGS. 7A, 7B, 7C, and 7D illustrate an example of programs for generating an mpss field included in a storage format according to another embodiment of the present invention;

DETAILED DESCRIPTION OF THE INVENTION

Hereinafter, embodiments of the present invention will be described with reference to the accompanying drawings. For the purposes of clarity and simplicity, a detailed description of known functions and configurations incorporated herein will be omitted as it may make the subject matter of the present invention rather unclear.

Figure 2:
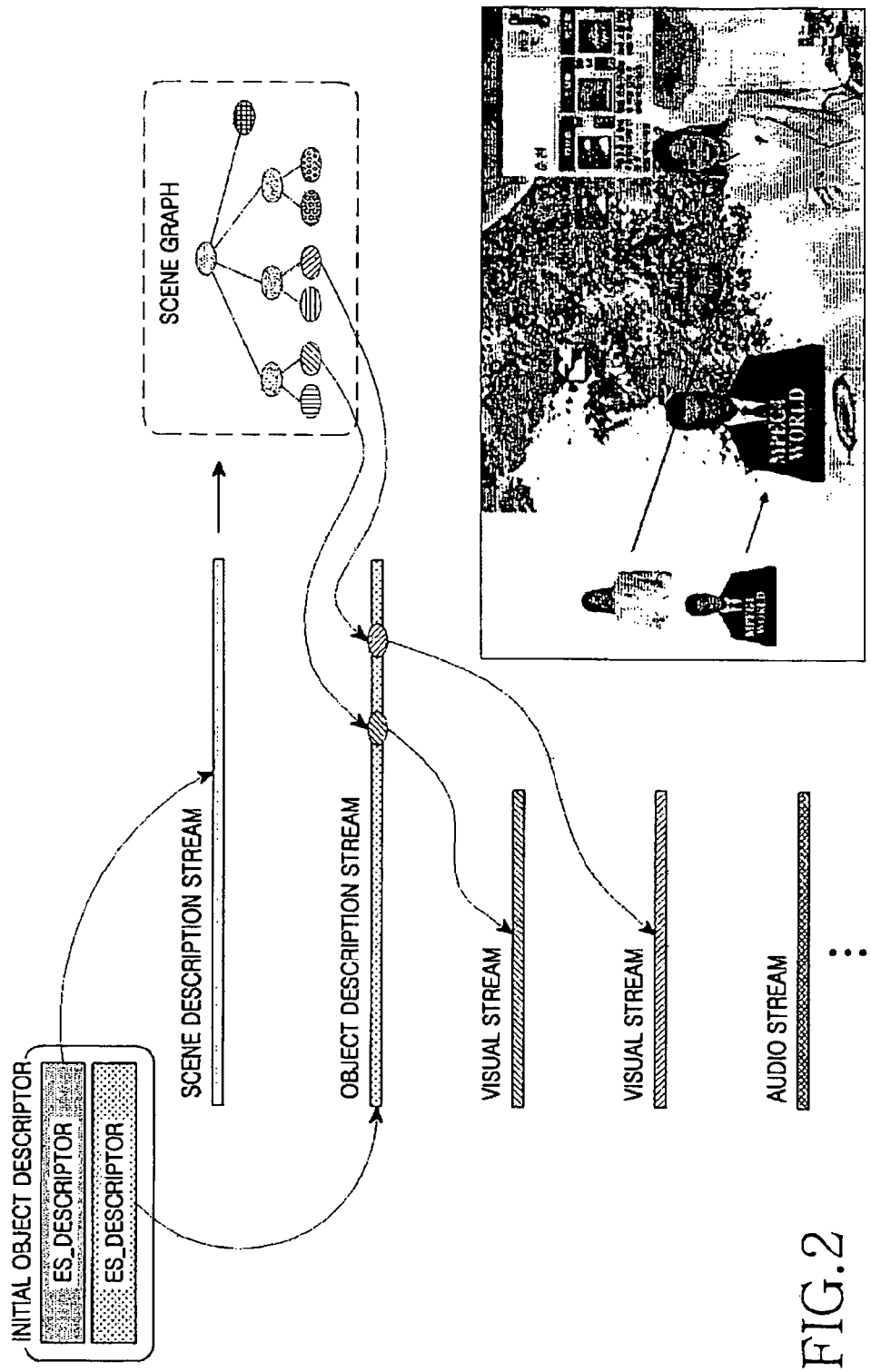
FIG. 2 illustrates an example of a stereoscopic image included in a three-dimensional image according to an embodiment of the present invention.

The present invention newly provides a private transport connection identifier (CID), which is a specific connection identifier (CID) used within only one mobile station (MS). The private transport CID will be described in more detail with reference to FIG. 3, after describing a conventional scheme for allocating a transport CID with reference to FIG. 2.

Figure 1:
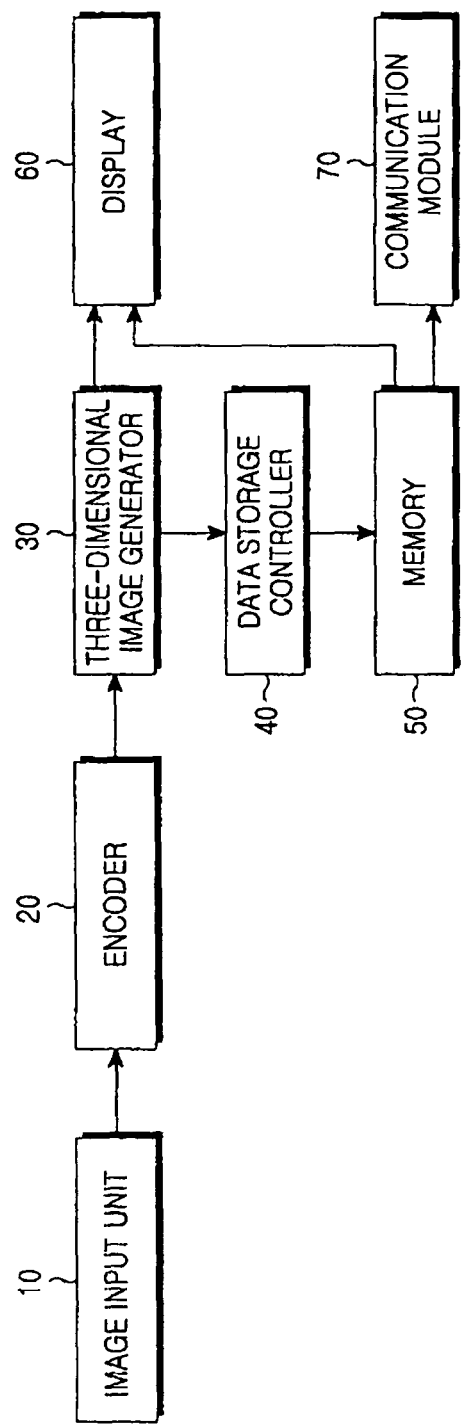
FIG. 1 is a block diagram of a stereoscopic image photographing apparatus to which the present invention is applied.

FIG. 1 is a block diagram of a stereoscopic image photographing apparatus to which the present invention is applied.

The stereoscopic image photographing apparatus includes an image input unit 10, an encoder 20, a three-dimensional image generator 30, a data storage controller 40, a memory 50, and a display 60.

The image input unit 10 corresponds to a means for the input of multiple images necessary for generation of a stereoscopic image, and includes multiple lenses, through which color signals of particular wavelengths reflected from an object are projected with various angles, and multiple sensor modules (modules including sensors, such as CCD, CMOS, etc.) for converting the color signals input through the lenses to electric signals. Further, the image input unit 10 includes a video signal processing apparatus, which converts data input from the multiple sensor modules into image signals including temporal/spatial information, thereby generating as many pieces of image data as the sensor modules. For example, when the stereoscopic image includes a combination of media data of a left image and a right image, the image input unit 10 includes a lens and a sensor module for photographing a left part of an object and a lens and a sensor module for photographing a right part of the object, so that the image input unit 10 generates a three-dimensional image including a left image and a right image by using data input from the two sensor modules.

The encoder 20 encodes the image data (including the left image data and the right image data) output from the image input unit 10, and may employ a typical dynamic image encoding scheme (for example, MPEG-1, MPEG-2, MPEG-3, MPEG-4, H.264 scheme).

The three-dimensional image generator 30 generates three-dimensional image data from multiple pieces of encoded media data, in consideration of a distance from a photographing object, a photographing angle, movement of a photographing apparatus, etc.

Meanwhile, if a user views three-dimensional images including only stereoscopic images for long time, the user's eyes feel more fatigue than when the user views monoscopic images. Due to this reason, it is difficult for a user to view three-dimensional images including only stereoscopic images for a long time. Therefore, in order to reduce fatigue of the eyes and guarantee long-time viewing of the three-dimensional images, it is preferred that the three-dimensional images include synthetic images which are a combination of a monoscopic image and a stereoscopic image rather than including only the stereoscopic images. The stereoscopic images and monoscopic images can be properly combined either under the control of a user of the photographing apparatus or according to predetermined conditions set in advance in the photographing apparatus. The predetermined conditions may be designed to periodically photograph the stereoscopic images or monoscopic images with predetermined time intervals or to selectively photograph the stereoscopic images and monoscopic images according to the property or kind of the photographed objected.

Moreover, the stereoscopic images may further include various media objects, such as voice information and text information, and the stereoscopic image photographing apparatus may include a microphone for converting a generated voice signal to an electric signal, a voice compressing unit for compressing an audio signal, a voice information input interface connected to a voice input terminal for input of voice information from the outside. Further, the stereoscopic image photographing apparatus may include a text information input interface for input of text information from the outside.

Further, the three-dimensional image generator 30 provides three-dimensional image configurative information including image, voice, and text information of the three-dimensional image to the data storage controller 40.

The data storage controller 40 stores three-dimensional image data generated from the three-dimensional image configurative information and three-dimensional image data provided from the three-dimensional image generator 30 in the memory 50. Further, the display 60 outputs the three-dimensional images generated by the three-dimensional image generator 30.

Further, the stereoscopic image photographing apparatus according to the present invention may include a communication module 70. The communication module 70 may be an interface capable of transmitting the three-dimensional images stored in the memory 50 to external devices (such as a mobile terminal, a PDA, a portable terminal having a wireless LAN, a personal computer supporting a USB or serial communication).

Hereinafter, a method in which the data storage controller 40 stores the three-dimensional image data in the memory 50 will be described.

A method of storing three-dimensional image data according to an embodiment of the present invention corresponds to a method of storing the three-dimensional images based on the object, in order to effectively store the three-dimensional images including stereoscopic images and multiple media objects. Especially, when the three-dimensional images include a combination of stereoscopic images and various media objects (refer to FIG. 2), this method separately stores overall configurative information of the three-dimensional images, the type of the object of each media included in the three-dimensional images (i.e. if the object is a three-dimensional image), and metadata for each media object.

Figure 3:
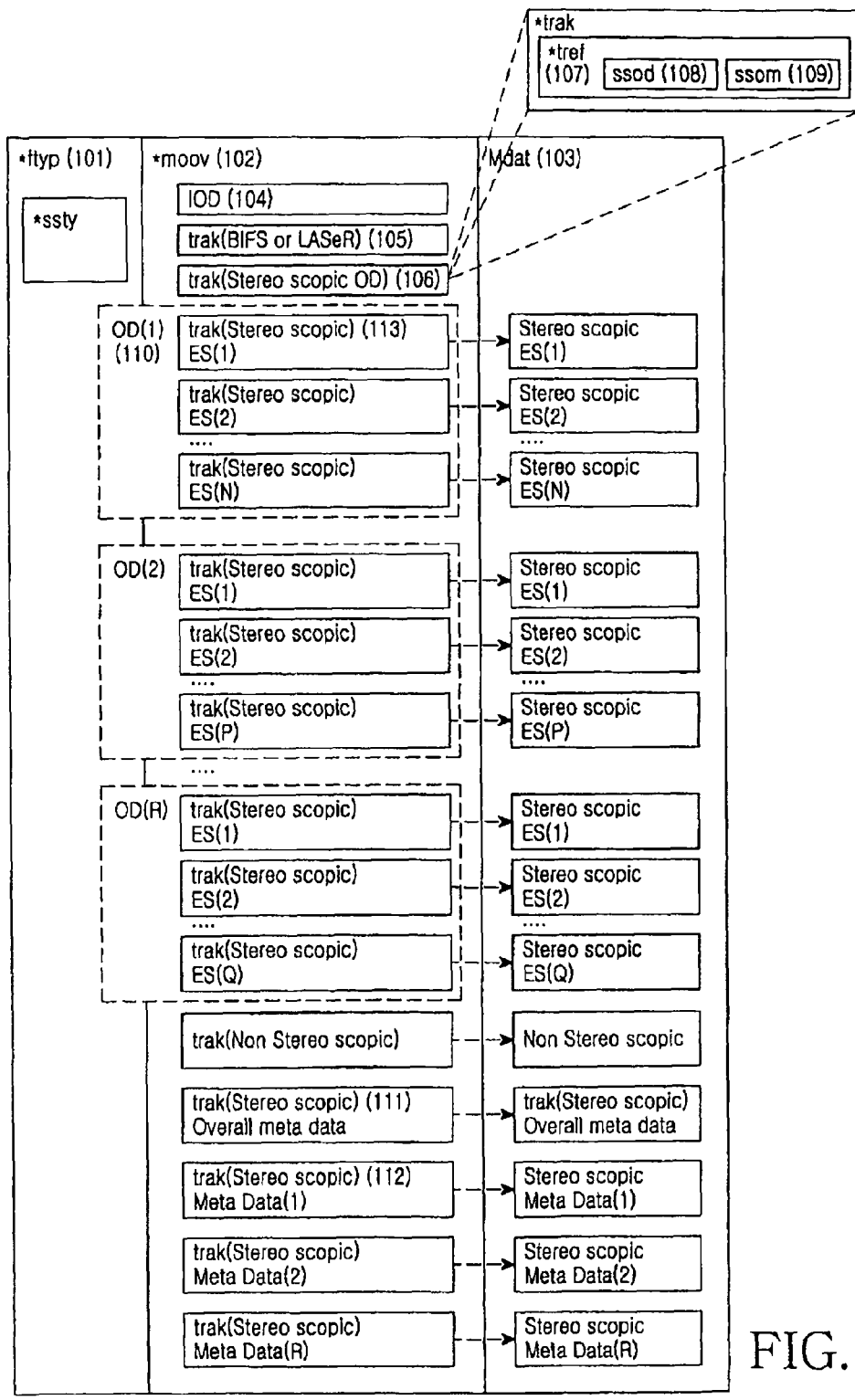
FIG. 3 illustrates a storage format of three-dimensional image data according to an embodiment of the present invention.

FIG. 3 illustrates a storage format of three-dimensional image data according to an embodiment of the present invention. Referring to FIG. 3, the storage format of three-dimensional image data stored in the memory 50 by the data storage controller 40 includes an ftyp header 101, an moov container 102, and an mdat container 103. The data storage controller 40 records a filename, version information, a file type, and compatibility information of the file in the ftyp header 101. The file type includes information on if the three-dimensional images include one or more selected from among stereoscopic images, monoscopic images, still images, audio images, and text media.

Further, the configurative information of the object-based encoded three-dimensional image is contained in the moov container 102. Moreover, a bit stream for media data included in the object-based encoded three-dimensional image is contained in the mdat container 103.

Specifically, the moov container 102 includes fields containing scene descriptor information indicating temporal and spatial relations between the media objects, which include an Initial Object Descriptor (IOD) track 104, a Binary Format For Scenes (BIFS) track 105, and an Object Descriptor (OD) track 106. The IOD track 104 includes profile information on the BIFS track and the OD track together with all media objects included in the three-dimensional images. The BIFS track 105 includes information of configurative relation of media objects included in each scene. Further, the OD track 106 contains information on attributes of each media object.

According to the embodiment of the present invention as described above, the information of configurative relation of media objects is contained in the BIFS track 105. However, the present invention is not limited to this embodiment, and includes any embodiment wherein the information of configurative relation of media objects can be contained in a track. For example, instead of the BIFS track 105, the information of configurative relation of media objects can be contained in a Light-weight Application Scene Representation (LASeR) track.

Further, the moov container 102 includes a first metadata track 111 containing meta information of a plurality of media objects included in the three-dimensional images and a second metadata track 112 containing meta information of encoded streams included in each media object of said plurality of media objects.

The moov container 102 includes a stream information track 113 containing configurative information of encoded streams included in each media object of said plurality of media objects. Herein, a media object of an image can be variously defined as compositions of a stereoscopic image.

The configurative information of encoded streams include the configurative information of synthetic images about configuration of stereoscopic image and monoscopic image.

Meanwhile, the OD track 106 includes a tref field 107 containing reference information. The tref field 107 includes an ssod field 108 containing not only the stereoscopic images, but also media object and object descriptor information on metadata corresponding to the media object.

Specifically, the ssod field 108 includes information defining the number of media objects of said plurality of media objects configuring a scene and information defining if each media object of said plurality of media objects is a stereoscopic image. Further, the ssod field 108 includes information defining if there exists the first metadata track 111 containing metadata of each media object of said plurality of media objects. In addition, when the first metadata track 111 for each media object exists, the ssod field 108 may further include information indicating the second metadata track 112 corresponding to the media object.

The ssod field 108 as described above can be generated through an operation corresponding to the program shown in FIG. 4. In FIG. 4, the stereoscopic_od_entry_count indicates the number of ODs for a stereoscopic image indicated by the scene, and the stereoscopic_od_type indicates if the configured OD is a stereoscopic image. For example, when the stereoscopic_od_type is set to "1," it indicates that the OD is a stereoscopic image. The metadata-flag indicates if the configured OD requires metadata. For example, when metadata-flag is set to "1," it indicates that the OD requires metadata. The stereoscopic_es_entry_count indicates the number of ESs of the configured OD. The metadata-track-ID indicates a track ID of the metadata to be applied to the configured OD, and the track-ID indicates a track ID corresponding to the ES.

The tref field 107 further includes a ssom field 109 containing information capable of pointing the first meta container track 111. The ssom field 109, which facilitates access to metadata of overall contents, contains information indicating the first metadata 111. The ssom container 109 as described above can be generated through an operation corresponding to the program shown in FIG. 5. In FIG. 5, the track_ID refers to a track identifier for metadata applicable to the entire stereoscopic file.

Further, the mdat container 103 contains an encoded stream of each media object included in the three-dimensional image.

In the case of single type contents including only stereoscopic images, decoding information for decoding the stereoscopic images constituting the single type contents should be described in the corresponding file format. Further, in the case of synthetic contents including stereoscopic images and media objects, one scene may include a plurality of media objects. Therefore, the synthetic contents can be stored based on temporal spatial configurative information for the plurality of media objects. In addition, in the case of storing the synthetic contents based on the configurative information of the plurality of media objects, decoder information for decoding the plurality of media objects according to each encoded stream thereof should be described in the file format.

As described above, three-dimensional images including different types of contents require different decoder information. Therefore, in order to store three-dimensional images including different types of contents, different decoder information should be defined for the different types of contents. In conclusion, there is a need for an effective storage method capable of supporting all of the three-dimensional images including different types of contents.

Hereinafter, a method of storing three-dimensional images in a file format capable of supporting both the three-dimensional images including single type contents and the three-dimensional images including synthetic contents will be described in detail.

Figure 6:
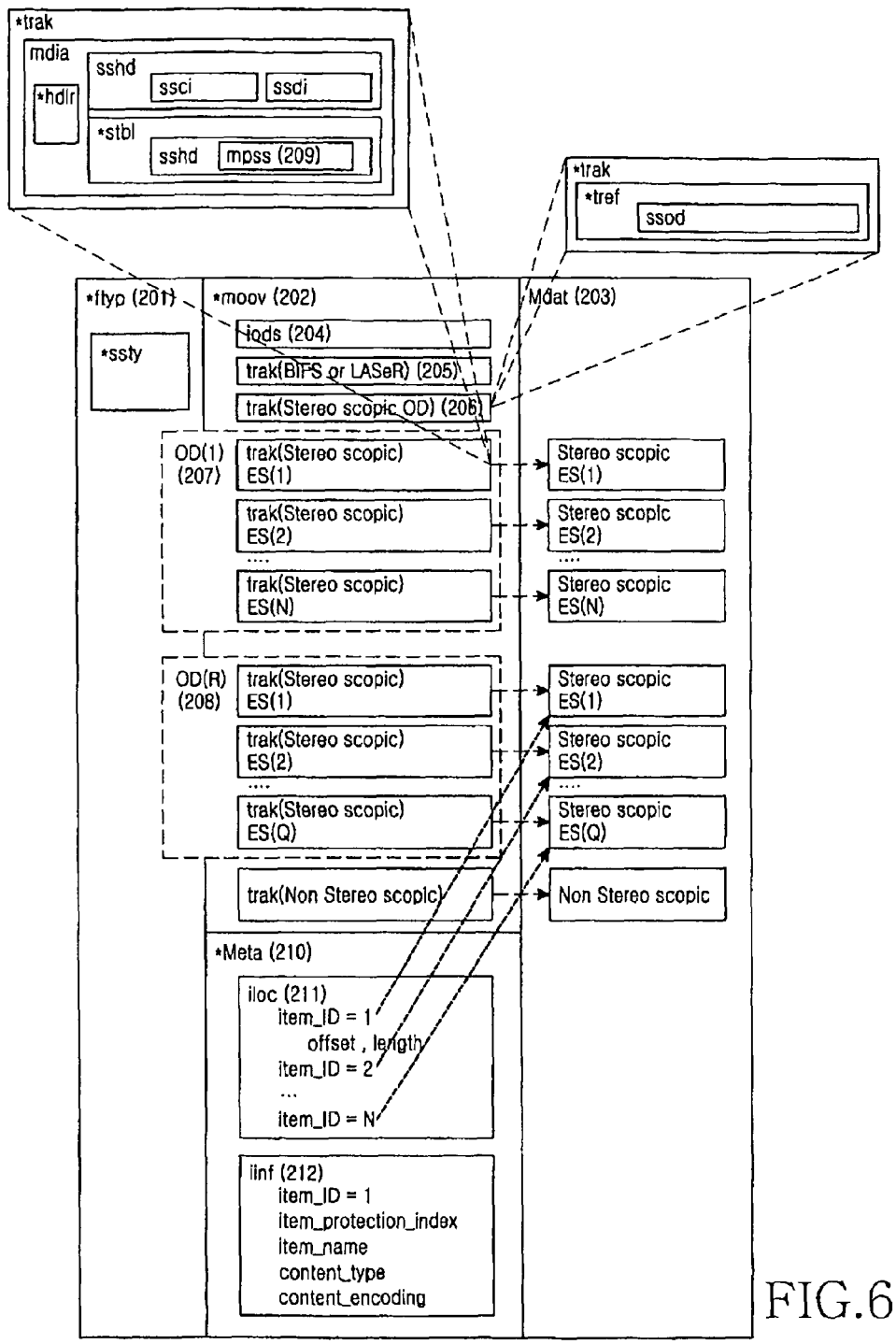
FIG. 6 illustrates a format for storing three-dimensional image data according to another embodiment of the present invention.

FIG. 6 illustrates a format for storing three-dimensional image data according to another embodiment of the present invention. Referring to FIG. 6, the storage format of the three-dimensional image data stored in the memory 50 by the data storage controller 40 includes an ftyp header 201, an moov container 202, and an mdat container 203.

The ftyp header 201 and an mdat container 203 according to the present embodiment of the present invention contain the same data as that of the ftyp header 101 and an mdat container 103 according to the previous embodiment of the present invention, respectively. Therefore, a detailed description of the ftyp header 201 and an mdat container 203 will be omitted here.

The three-dimensional images including the synthetic contents can be stored based on a plurality of media objects. When the three-dimensional images including the synthetic contents are stored based on a plurality of media objects, the data storage controller 40 loads, in the moov container 202, fields containing scene descriptor information indicating temporal and spatial relations between the plurality of media objects, which include an IOD track 204, a BIFS track 205, and an OD track 206. The IOD track 204 includes profile information on the BIFS track and the OD track together with the plurality of media objects included in the three-dimensional images. The BIFS track 205 includes information of configurative relation of the plurality of media objects included in each scene. Further, the OD track 206 contains information on attributes of each media object of the plurality of media objects. It should be noted that the plurality can be a single media object, i.e., at least one media object.

Further, the data storage controller 40 loads, in the moov container 202, multiple stream tracks of object units 207 and 208 containing Elementary Stream (ES) included in each media object of the plurality of media objects. Each encoded stream track included in the multiple stream tracks of the object units 207 and 208 contains a definition for differently storing decoder information according to existence or absence of scene descriptor information of contents. The definition for differently storing decoder information is contained in the mpss container 209.

The mpss container 209 can be generated through operations corresponding to the example programs shown in FIGS. 7A, 7B, 7C, and 7D.

Table 1 below shows detailed information on the stereoscopic ES shown in FIGS. 7A, 7B, 7C, and 7D.

TABLE 1

| Value | Contents |
|---|---|
| Mpss | StereoScopic Visual sample Entry |
| mp4v | Visual Sample Entry |
| mp4a | Audio Sample Entry |

Further, the StereoScopic_Composition Type includes information on image configuration of stereoscopic data including one ES. Table 2 below shows indication of the information.

TABLE 2

| Value | Contents |
|---|---|
| 000 | Stereoscopic data having frames crossing according to time |
| 001 | Stereoscopic data configured side by side |
| 010 | Stereoscopic data configured in a top-down manner |
| 011 | Stereoscopic data having frames vertically crossing according to the field |
| 100 | Stereoscopic data having frames horizontally crossing according to the field |

The width_or_height indicates the width of an image when the StereoScopic_CompositionType is "0b001," the height of an image when the StereoScopic_CompositionType is "0b010," the number of vertically crossing vertical lines for each field when the StereoScopic_CompositionType is "0b011," and the number of horizontally crossing horizontal lines for each field when the StereoScopic_CompositionType is "0b100."

The odd_field_count includes "0" when the StereoScopic_CompositionType is "0b001" and "0b010," and a number of an odd field when the StereoScopic_CompositionType is "0b011" and "0b100." The even_field_count includes "0" when the StereoScopic_CompositionType is "0b001" and "0b010," and a number of an even field when the StereoScopic_CompositionType is "0b011" and "0b100."

The StereoScopic_ES_FrameSync indicates a difference between frame rates of the left image (or odd field) and the right image (or even field), and includes information indicating a synchronization method when the frame rates are different. Table 3 below shows the indication by the information.

TABLE 3

| Value | Contents |
|---|---|
| 00 | When StereoScopic_ES_count is 1, the frame rates of the left image (or odd field) and the right image (or even field) are the same. When StereoScopic_ES_count is 2, the frame rates of the left image (or odd field) and the right image (or even field) are the same or unnecessary. |
| 01 | When StereoScopic_ES_count is 1, the left image (or odd field) is set as a reference image since the frame rates of the left image (or odd field) and the right image (or even field) are different. When StereoScopic_ES_count is 2, the frame rates of the left image and the right image are different and are synchronized based on a declared ES. |
| 10 | When StereoScopic_ES_count is 1, the frame rates of the left image (or odd field) and the right image (or even field) are different and the right image (or even field) is set as a reference image. When StereoScopic_ES_count is 2, the frame rates of the left image and the right image are different and are synchronized based on a matching ES. |

The StereoScopic_ImageInformationDifference includes information indicating a difference in image information between the left image (or odd field) and image information of the right image (or even field). Table 4 below shows the indication by the information.

TABLE 4

| Value | Contents |
|---|---|
| 00 | When StereoScopic_ES_count is 1, there is no difference in image information between the left image (or odd field) and the right image (or even field). When StereoScopic_ES_count is 2, no difference in image information exists or is required between the left image (or odd field) and the right image (or even field). |

TABLE 4-continued

| Value | Contents |
|---|---|
| 01 | When StereoScopic_ES_count is 1, there is a difference in image information between the left image (or odd field) and the right image (or even field), and the difference is obtained based on the left image (or odd field).<br>When StereoScopic_ES_count is 2, there is a difference in image information between the left image (or odd field) and the right image (or even field), and the difference is obtained based on a declared ES. |
| 10 | When StereoScopic_ES_count is 1, there is a difference in image information between the left image (or odd field) and the right image (or even field), and the difference is obtained based on the right image (or even field).<br>When StereoScopic_ES_count is 2, there is a difference in image information between the left image (or odd field) and the right image (or even field), and the difference is obtained based on a matching ES. |

The Y_or_R_difference indicates image information Y difference value or R difference value, the Cb_or_G_difference indicates image information Cb difference value or G difference value, and the Cr_or_B_difference indicates image information Cr difference value or B difference value.

Further, the StereoScopic_ES_Type indicates information on the stereoscopic type of the ES. Table 5 below shows that information.

TABLE 5

| Value | Contents |
|---|---|
| 00 | Left image |
| 01 | Right image |
| 10 | Reference image |
| 11 | Additional data |

The StreamType indicates the type of the ES stream, and functions the same as the StreamType of the DecoderConfigDescriptor of the ES_Descriptor in 14496-1 (see "streamType Values" Table of 14496-1 8.6.6 of ISO base media file format).

The ObjectTypeIndication indicates a necessary decoder of an ES stream, functions the same as the ObjectTypeIndication of DecoderConfigDescriptor of the ES_Descriptor in 14496-1 (see "objectTypeIndication Values" Table of 14496-1 8.6.6.).

The DecoderSpecificInfoLength indicates the length of the DecoderSpecificInfoStream, and functions the same as the DecoderSpecificInfo the ES_Descriptor in 14496-1.

Figure 8:
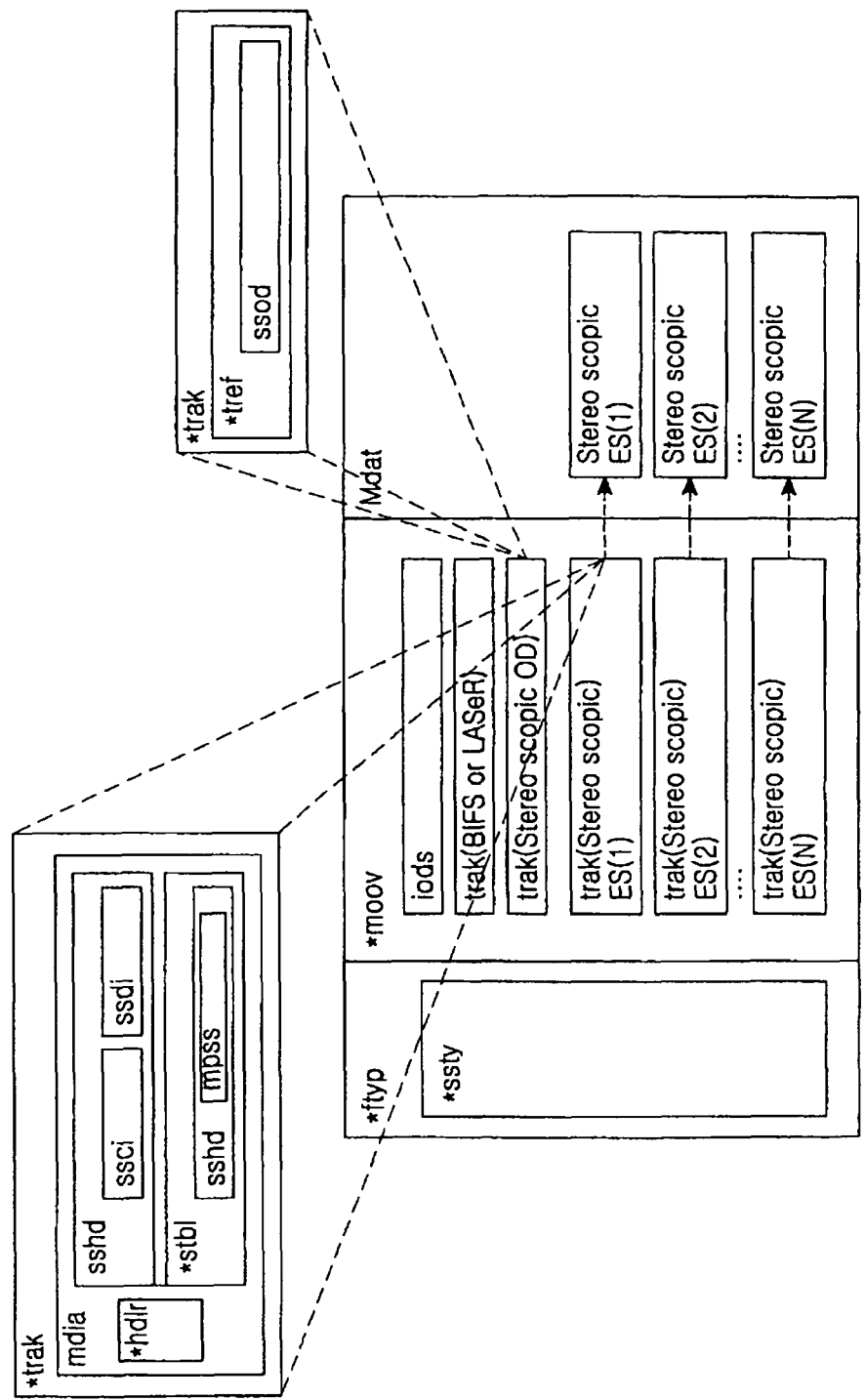
FIG. 8 illustrates a structure of a data storage format in the case of including scene descriptor information according to another embodiment of the present invention.
Figure 9:
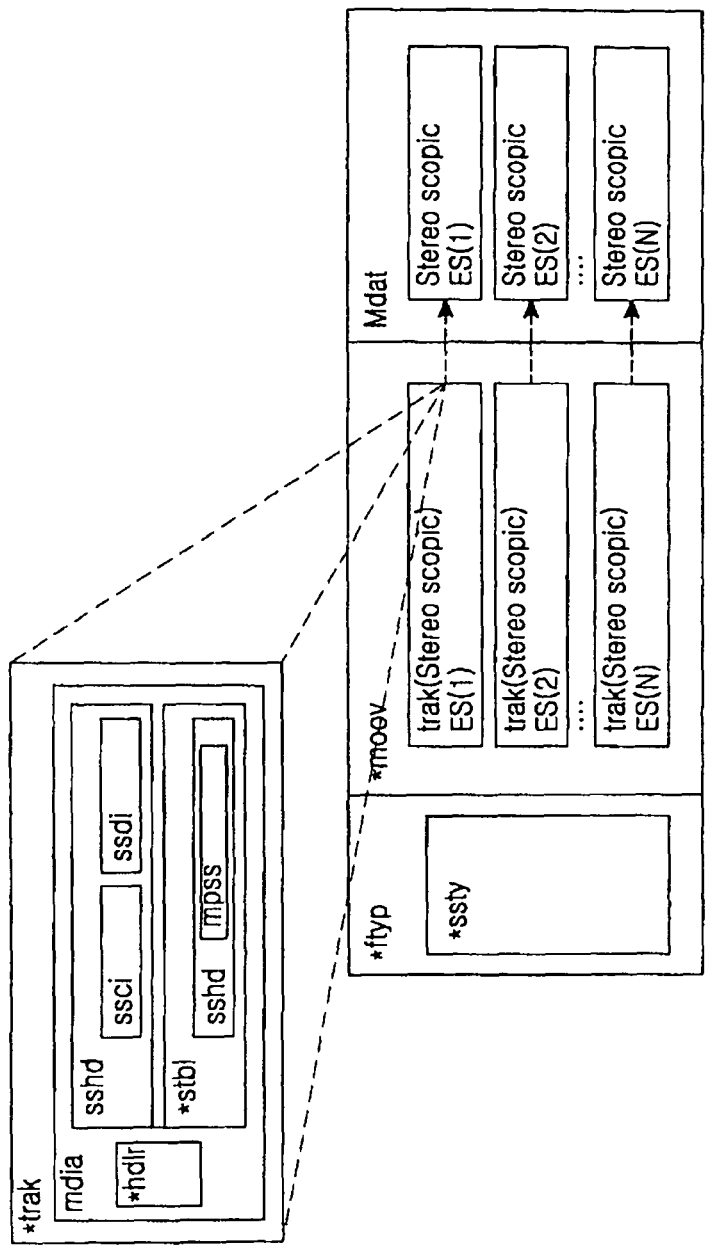
FIG. 9 illustrates a structure of a data storage format in the case of including no scene descriptor information according to another embodiment of the present invention.

Meanwhile, FIG. 8 illustrates a structure of a data storage format in the case of including scene descriptor information according to another embodiment of the present invention, and FIG. 9 illustrates a structure of a data storage format in the case of including no scene descriptor information according to another embodiment of the present invention.

As shown in FIG. 8, when a three-dimensional image having synthetic contents includes scene descriptor information, the three-dimensional image inevitably includes IOD information. Therefore, by determining if it includes an IOD field containing IOD information, it is possible to determine if the three-dimensional image includes scene descriptor information. Therefore, if the moov container IOD information, decoder information on the three-dimensional image is stored in an ES Descriptor (ESD) defined in MPEG-4 Systems.

In contrast, as shown in FIG. 9, when a three-dimensional image having single type contents does not include IOD information, decoder information on the three-dimensional image is stored in the mpss field. The decoder information stored in the mpss field includes a stream type, a type of media object of the stream (e.g. Object type indication defined in the MPEG-4 Systems), profile information, and detailed information (e.g. width of an image) required to restore the media object by the decoder.

Through the operations corresponding to the programs shown in FIGS. 7A, 7B, 7C, and 7D, especially through the operation 300 of FIG. 7B and the operation 350 of FIG. 7D, the data storage controller 40 can effectively store decoder information on a three-dimensional image in consideration of existence or absence of scene descriptor information.

Further, the data storage controller 40 loads a meta information field 210 containing information on corresponding metadata in the moov container 202. The meta information field 210 includes an iloc field 211 and an iinf field 212. The iloc field 211 contains an identifier (e.g. Item_ID) of an encoded stream, and information on the length of a bit stream of the encoded stream (e.g. offset and length), and the iinf field 212 contains a name of each encoded stream, content type, and encoding information.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A method of storing a three-dimensional image, which has been generated by converting an image input by an apparatus supporting photographing of an object, into a recording medium, the method comprising:
   loading, in a predetermined file type field, image type information indicating a single stereoscopic image when the single stereoscopic image is to be stored, and indicating a combined video image when the combined video image is to be stored, the combined video image including a monoscopic image of the photographed object and a stereoscopic image of the photographed object which are temporally separated, wherein the stereoscopic image being of a type having a left image and a right image of the photographed object captured from different sensor modules;
   loading, in a configurative information container field, scene descriptor information indicating temporal and spatial relations between at least one of medias included in the three-dimensional image, configurative information indicating attributes of the at least one of medias and a configurative relation between encoded streams of the at least one of medias; and
   loading, in a media data container field, a bit stream of the at least one of medias included in the three-dimensional image,
   wherein the configurative information container field further comprises iloc information indicating a location of the bit stream and information indicating a stream type of the bit stream,
   wherein the iloc information comprises information indicating a length of the bit stream, an offset of the bit stream, and an identifier of the bit stream, and
   wherein the configurative information container field further comprising an information item indicating a difference between frame rates of the left image and right image; and an information item indicating a synchronization method when the frame rates of the left and right images are different.

2. The method of claim 1, wherein the configurative information container field comprises:
- information indicating the number of the at least one of medias included in a scene;
- information indicating whether the at least one of medias is a stereoscopic image;
- information indicating whether the at least one of medias requires metadata;
- information indicating the number of encoded streams included in the at least one of medias;
- when metadata is applied to the at least one of medias, information indicating a track including a metadata to be applied; and
- information indicating a track including an encoded stream.

3. The method of claim 2, wherein the configurative information container field further comprises information indicating a track including metadata applicable to an overall stereoscopic image.

4. The method of claim 1, wherein the configurative information container field further comprises loading configurative information of the combined image, when combined image data is indicated.

5. The method of claim 1, wherein the monoscopic image and stereoscopic image are temporally separated in the combined image by periodic time intervals.

6. The method of claim 1, wherein the monoscopic image and stereoscopic image are temporally separated in the combined image according to a property or type of a photographed object.

7. A method of storing a three-dimensional image, which has been generated by converting an image input by an apparatus supporting photographing of an object, into a recording medium, the method comprising:
- loading, in a predetermined file type field, image type information indicating a single stereoscopic image when the single stereoscopic image is to be stored, and indicating a combined video image when the combined video image is to be stored, the combined video image including a monoscopic image of the photographed object and a stereoscopic image of the photographed object which are temporally separated, wherein the stereoscopic image being of a type having a left image and a right image of the photographed object captured from different sensor modules;
- loading, in a configurative information container field, configurative information indicating attributes of at least one of medias and a configurative relation between encoded streams of at least one of medias included in the three-dimensional image; and
- loading, in a media data container field, a bit stream of at least one of medias included in the three-dimensional image,
- wherein scene descriptor information of a scene indicating temporal and spatial relations between the at least one of medias included in the three-dimensional image is selectively loaded in the configurative information container field,
- wherein the configurative information container field further comprises iloc information indicating a location of the bit stream and information indicating a stream type of the bit stream,
- wherein the iloc information comprises information indicating a length of the bit stream, an offset of the bit stream, and an identifier of the bit stream, and
- wherein the configurative information container field further comprising an information item indicating a difference between frame rates of the left image and right image; and an information item indicating a synchronization method when the frame rates of the left and right images are different.

8. The method of claim 7, wherein the scene descriptor information comprises:
- an initial scene descriptor information field containing information on initial access pointer and scene description;
- a scene information field containing information on a configurative relation of the at least one of medias included in the scene; and
- an object configurative information field containing information on attributes of the at least one of medias included in the scene.

9. The method of claim 8, wherein, when the configurative information container field includes the initial scene descriptor information, the configurative information container field contains decoder information on the at least one of medias included in the initial scene descriptor information.

10. The method of claim 8, wherein, when the configurative information container field does not include the initial scene descriptor information, the configurative information container field contains decoder information on the at least one of medias included in the stereoscopic image.

11. The method of claim 10, wherein the decoder information on the at least one of medias included in the stereoscopic image comprises types of the encoded streams, media types of the encoded streams, profile information, and detailed information on an image.

12. The method of claim 11, wherein the media types correspond to information set based on Object Type Indication (OTI) defined by an ISO/IEC 14496 MPEG-4 system.

13. The method of claim 7, wherein the configurative information container field comprises first metadata on the at least one of medias and second metadata on correlation between the at least one of medias and the encoded stream thereof.

14. The method of claim 13, wherein the first metadata comprises information on a length of a bit stream of an encoded stream and an identifier of the encoded stream, and the second metadata comprises information on a name and a content type of each encoded stream, and encoding information.

15. The method of claim 7, wherein the monoscopic image and stereoscopic image are temporally separated in the combined image by periodic time intervals.

16. The method of claim 7, wherein the monoscopic image and stereoscopic image are temporally separated in the combined image according to a property or type of a photographed object.

17. A method of storing a three-dimensional image, which has been generated by converting an image input by an apparatus supporting photographing of the three-dimensional image, into a recording medium, the method comprising:
- loading, in a predetermined file type field, image type information indicating one of a single stereoscopic image and a combined video image including a monoscopic image and a stereoscopic image, each stereoscopic image being of a type having a left image and a right image of a photographing object captured from different sensor modules;
- loading, in a configurative information container field, configurative information indicating attributes of at least one of medias and a configurative relation between encoded streams of at least one of medias included in the three-dimensional image; and loading, in a media data container field, a bit stream of at least one of medias included in the three-dimensional image, wherein scene descriptor information of a scene indicating temporal and spatial relations between the at least one of medias included in the three-dimensional image is selectively loaded in the configurative information container field, wherein the configurative information container field further comprises:

iloc information indicating a location of the bit stream of the at least one of medias, the iloc information comprising information on a length of the bit stream, an offset of the bit stream, and an identifier of the bit stream;

information indicating a stream type of the bit stream;

first metadata on the at least one of medias and second metadata on correlation between the at least one of medias and the encoded stream thereof, the first metadata comprising information on a length of a bit stream of an encoded stream and an identifier of the encoded stream, and the second metadata comprising information on a name and a content type of each encoded stream, and encoding information thereof;

a StereoScopic_Composition Type information item including information on an image configuration of stereoscopic data including one ES (Elementary Stream), and having a first value for indicating stereoscopic data having frames crossing according to time; a second value for indicating stereoscopic data configured side by side, a third value for indicating stereoscopic data configured in a top-down manner, a fourth value for indicating stereoscopic data having frames vertically crossing according to field; and a fifth value for indicating stereoscopic data having frames horizontally crossing according to field;

an information item indicating a difference between frame rates of the left image and right image; and an information item indicating a synchronization method when the frame rates of the left and right images are different.

18. A method of storing a three-dimensional image, which has been generated by converting an image input by an apparatus supporting photographing of the three-dimensional image, into a recording medium, the method comprising:

loading, in a predetermined file type field, image type information indicating one of a single stereoscopic image and a combined video image including a monoscopic image and a stereoscopic image, wherein each stereoscopic image being of a type having a left image and a right image of a photographing object captured from different sensor modules;

loading, in a configurative information container field, configurative information indicating attributes of at least one of medias and a configurative relation between encoded streams of at least one of medias included in the three-dimensional image; and loading, in a media data container field, a bit stream of at least one of medias included in the three-dimensional image, wherein scene descriptor information of a scene indicating temporal and spatial relations between the at least one of medias included in the three-dimensional image is selectively loaded in the configurative information container field, wherein the configurative information container field further comprises:

iloc information indicating a location of the bit stream of the at least one of medias, an offset of the bit stream, and information indicating a stream type of the bit stream, an information item indicating a difference between frame rates of the left image and right image; and an information item indicating a synchronization method when the frame rates of the left and right images are different.

19. A stereoscopic image photographing apparatus comprising:

an image input unit configured to generate three-dimensional image including a left image and a right image using image data of a photographed object input from different sensor modules;

an encoder to encode the image data;

a data storage controller;

a memory; and a display to display the three-dimensional image;

wherein the data storage controller is configured to store the image data in the memory by:

loading, in a predetermined file type field, image type information indicating a single stereoscopic image when the single stereoscopic image is to be stored, and indicating a combined video image when the combined video image is to be stored, the combined video image including a monoscopic image of the photographed object and a stereoscopic image of the photographed object which are temporally separated, wherein the stereoscopic image being of a type having a left image and a right image of the photographed object captured from the different sensor modules;

loading, in a configurative information container field, scene descriptor information indicating temporal and spatial relations between at least one of medias included in the three-dimensional image, configurative information indicating attributes of the at least one of medias and a configurative relation between encoded streams of the at least one of medias; and loading, in a media data container field, a bit stream of the at least one of medias included in the three-dimensional image, wherein the configurative information container field further comprises iloc information indicating a location of the bit stream, an offset of the bit stream, and information indicating a stream type of the bit stream, and wherein the configurative information container field further comprising an information item indicating a difference between frame rates of the left image and right image; and an information item indicating a synchronization method when the frame rates of the left and right images are different.

* * * * *